Dec. 29, 1925.

J. A. RIVORD

POWER MECHANISM

Filed April 25, 1925

WITNESS:
R. C. Thomas

Joseph A. Rivord INVENTOR

BY Victor J. Evans
ATTORNEY

Dec. 29, 1925.

J. A. RIVORD 1,567,753

POWER MECHANISM

Filed April 25, 1925     5 Sheets-Sheet 2

Joseph A. Rivord   INVENTOR

BY Victor J. Evans

ATTORNEY

WITNESS:

Dec. 29, 1925.

J. A. RIVORD 1,567,753

POWER MECHANISM

Filed April 25, 1925   5 Sheets-Sheet 3

Joseph A. Rivord
INVENTOR

BY Victor J. Evans
ATTORNEY

Dec. 29, 1925.
J. A. RIVORD
POWER MECHANISM
Filed April 25, 1925   5 Sheets-Sheet 4
1,567,753
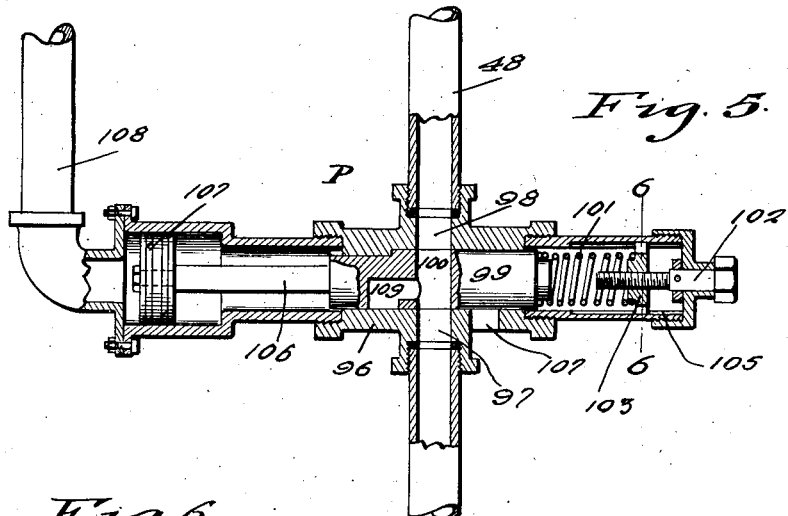
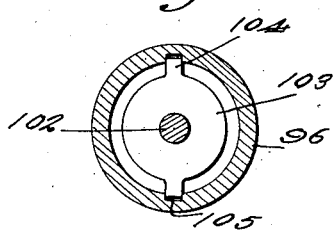
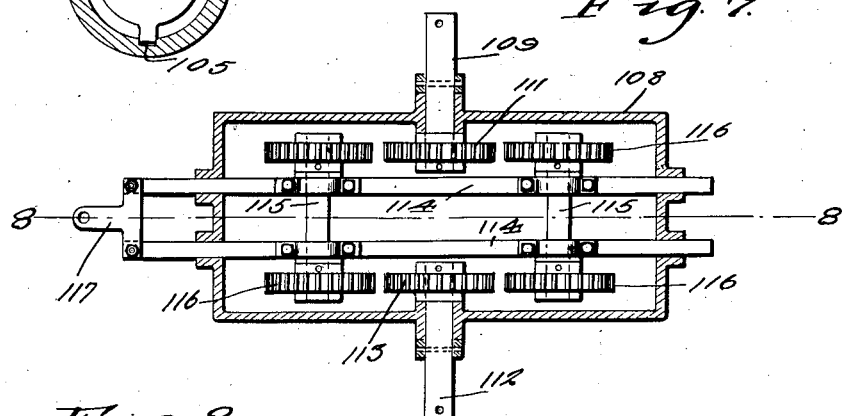
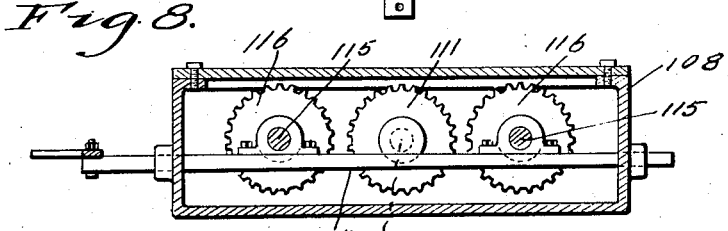
Joseph A. Rivord INVENTOR
BY *Victor J. Evans*
ATTORNEY
WITNESS:

Dec. 29, 1925.
J. A. RIVORD
POWER MECHANISM
Filed April 25, 1925    5 Sheets-Sheet 5
1,567,753
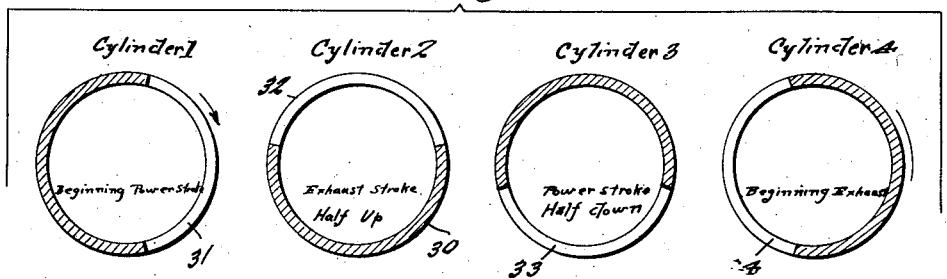
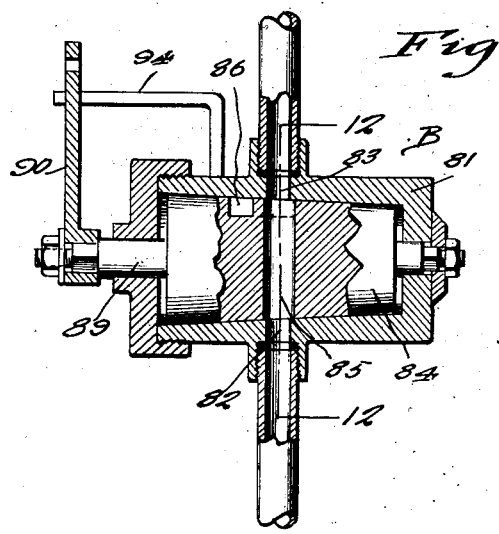
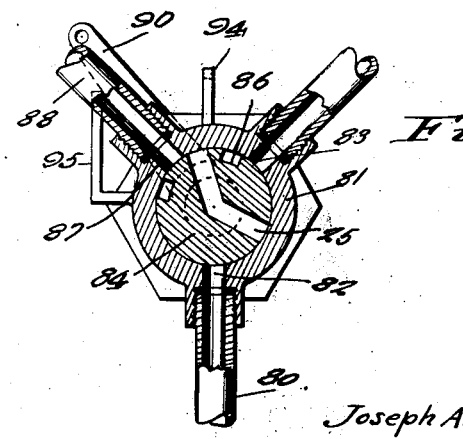
Joseph A. Rivord INVENTOR
BY Victor J. Evans ATTORNEY
R. Q. Thomas
WITNESS:

Patented Dec. 29, 1925.

1,567,753

UNITED STATES PATENT OFFICE.

JOSEPH A. RIVORD, OF PEKIN, ILLINOIS.

POWER MECHANISM.

Application filed April 25, 1925. Serial No. 25,821.

*To all whom it may concern:*

Be it known that I, JOSEPH A. RIVORD, a citizen of the United States, residing at Pekin, in the county of Tazewell and State of Illinois, have invented new and useful Improvements in Power Mechanism, of which the following is a specification.

This invention relates to power mechanisms and means for applying and controlling the same, the invention being especially adapted for supplying cheap, efficient and easily controlled power for the operation of vehicles.

More especially stated, the invention aims to provide an air engine with means for compressing air for the operation of the engine and in addition, an air controlled transmission mechanism and an air operated brake mechanism, so that the entire driving and controlling mechanisms may be operated through the instrumentality of compressed air.

With the above and other objects in view, the invention further includes the following novel features and details of construction, to be hereinafter more fully described, illustrated in the accompanying drawings and pointed out in the appended claims.

In the drawings:—

Figure 5 is an enlarged sectional view of the pressure regulating valve.

Figure 6 is an enlarged section on the line 6—6 of Figure 5.

Figure 7 is a sectional view of the selective transmission mechanism.

Figure 8 is a section on the line 8—8 of Figure 7.

Figure 11 is a sectional view of the brake valve.

Figure 12 is a sectional view taken substantially on the line 12—12 of Figure 11 but with the valve closed.

Figure 13 is a sectional view of the brake cylinder.

Figure 14 is a fragmentary elevation of the throttle valve and its controlling pedal.

Figure 15 is a similar view of the brake valve.

Figure 16 is a diagrammatic view showing the relative positions of the engine valve ports.

Referring to the drawings in detail like characters of reference denote corresponding parts throughout the several views.

Figure 2:
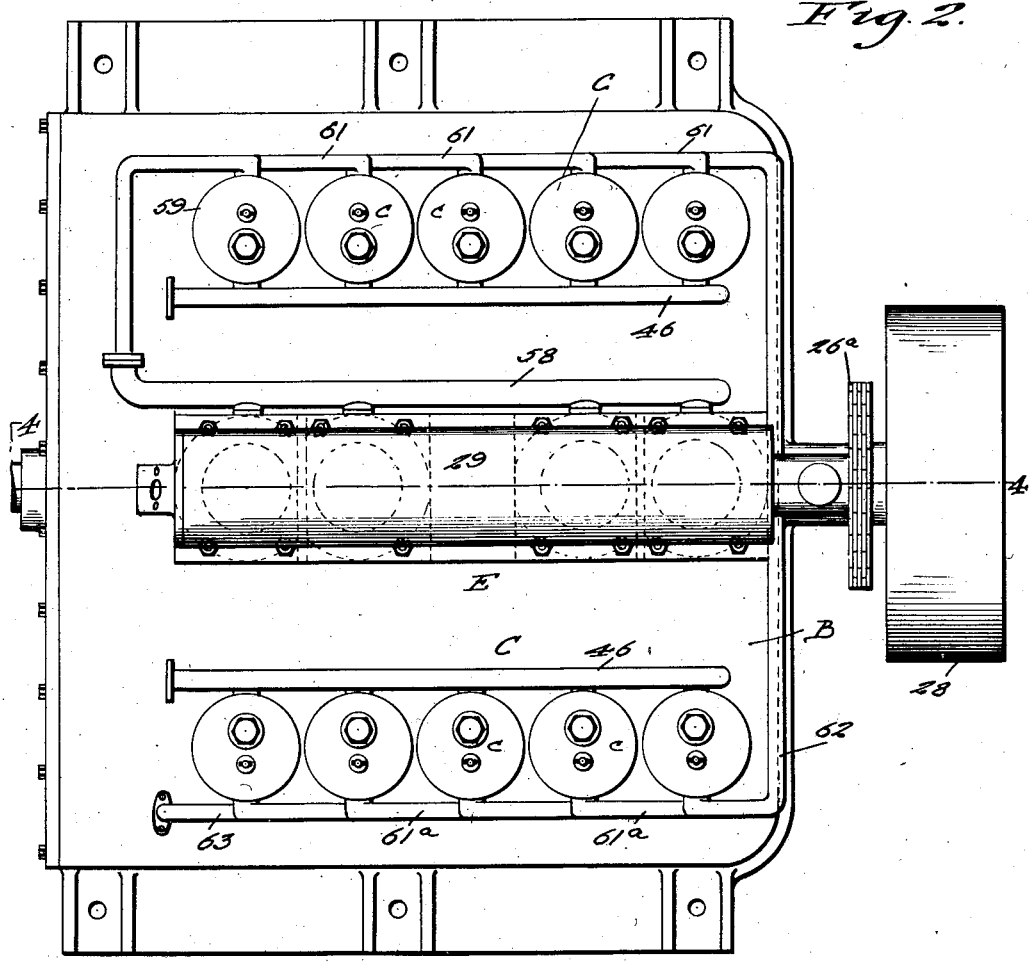
Figure 2 is a top plan view of the power unit.

The improved power mechanism which constitutes a part of the present invention is shown in connection with an automobile and comprises a power unit which is secured in any suitable manner upon the frame F. This power unit is illustrated in plan view in Figure 2 of the drawings and includes an engine E and two batteries of compressors C, one of which is located upon each side of the engine, while the engine and the compressors are mounted upon a suitable base B.

Figure 4:
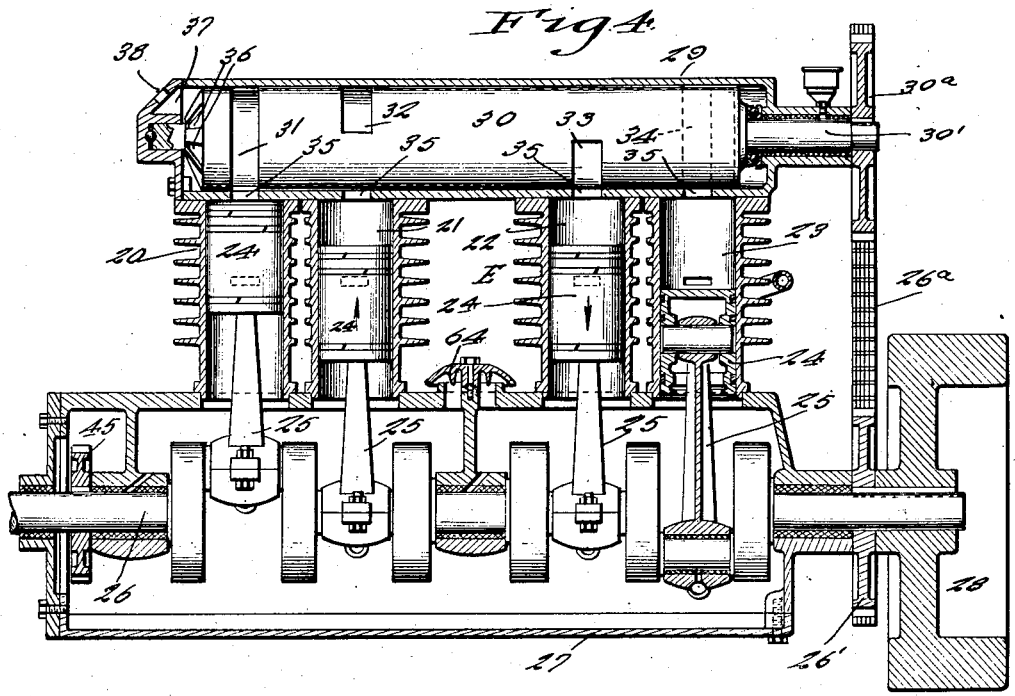
Figure 4 is a section taken substantially on the line 4—4 of Figure 2.

The engine E is operated by air from the compressors C and is shown as comprising four cylinders indicated at 20, 21, 22 and 23 in Figure 4 of the drawings. Each cylinder includes a piston 24 which is connected by means of a rod 25 with a crank shaft 26. This shaft is mounted in a suitable housing 27 and has secured thereon a fly wheel 28.

Mounted above the engine cylinders in a suitable housing 29 is a rotary valve 30. This valve is of hollow cylindrical construction and is provided with ports 31, 32, 33 and 34 which are adapted to register with ports 35 and communicating with the upper ends of the cylinders 20, 21, 22 and 23 respectively. One end of the valve 30 is provided with ports 36 which open from a chamber 37. This chamber is adapted to receive air through a port 38 so that air will enter the valve 30 and be distributed to the cylinders through their respective ports.

As shown in the diagram illustrated in Figure 16, the port 31 of the valve which controls the supply of air to the cylinder 20 is in position for the beginning of the power stroke of the piston, the valve 30 rotating in the direction of the arrow shown in Figure 16. The cylinder 20 may be designated cylinder #1 while the cylinder 21 may be designated cylinder #2 and so forth and the port 32 of the valve will be located as shown when the piston of cylinder #2 is half-way up on the exhaust stroke. When the piston of cylinder #3 is half-way down on the power stroke the port 33 will be as shown in Figure 16, while the port 34 will be in a reverse position from the port 31 when the piston of cylinder #4 is at the beginning of the exhaust stroke. The valve 30 has secured upon its shaft 30' a sprocket 30ª which is driven by a chain 26ª from a sprocket 26' secured to the crank shaft 26.

Each battery C of compressors comprises a plurality of separate compressor cylinders c, the latter having pistons 39 operating therein. The pistons 39 are connected by rods 40 with crank shafts 41, the connection being through the medium of eccentrics 42. Secured upon the shafts 41 are gears 43 and these gears are connected by idlers 44 with a gear 45 which is secured upon the crank shaft 26 of the engine, so that operation of the crank shaft 26 will transmit motion to the crank shafts 41 of both batteries of compressors for the operation of the latter.

Each compressor cylinder c is connected by a pipe 46 and the pipe 46 of each battery of compressors is connected by a pipe 47, the latter being connected by means of a pipe 48 with a pipe 49. This last mentioned pipe has its opposite ends in communication with tanks 50 and 51 for the storage of air from the compressors. In addition there is provided a storage tank 52 which is in communication with a tank 51 through a pipe 53. The tank 52 occupies the position of the radiator of the usual cooling system of an automobile and may be shaped to simulate the radiator if desired. Included in the pipe 48 is a pressure regulating valve P, the construction and operation of which will be hereinafter described. A pipe 54 supplies air from the tank 51 to the engine E, the said pipe communicating with the port 38 so as to supply air into the chamber 37 for distribution by the valve 30 as previously described. Connected in the pipe 54 is a throttle valve T, whose construction and operation will be hereinafter described. This valve controls the supply of air to the engine so as to regulate the speed of the latter.

Fresh air is drawn into the compressor cylinders through ports 55, the admission of air being controlled by check valves 56, while check valves 57 regulate passage of air from the cylinders to the pipes 46.

The engine E has each of its cylinders in communication with an exhaust manifold 58 which is also in communication with the upper end of one cylinder 59 of one battery of compressors C, the exhaust air entering cooling jackets 60 surrounding each cylinder c. Pipes 61 lead from the lower ends of one cylinder to the upper ends of the next adjacent cylinder, so that the exhaust air passes through the cooling jacket 60 of each cylinder of one battery and through a pipe 62 which leads from the lower end of one cylinder of this battery to the upper end of the first cylinder of the other battery, while pipes 61ª establish communication between the lower and upper ends of the cylinders of this last mentioned battery, the jacket of the last cylinder being in communication with the crank case 27 of the engine by means of a pipe 63. Air from the crank case exhausts through a pressure valve 64.

Figures 9, 10:
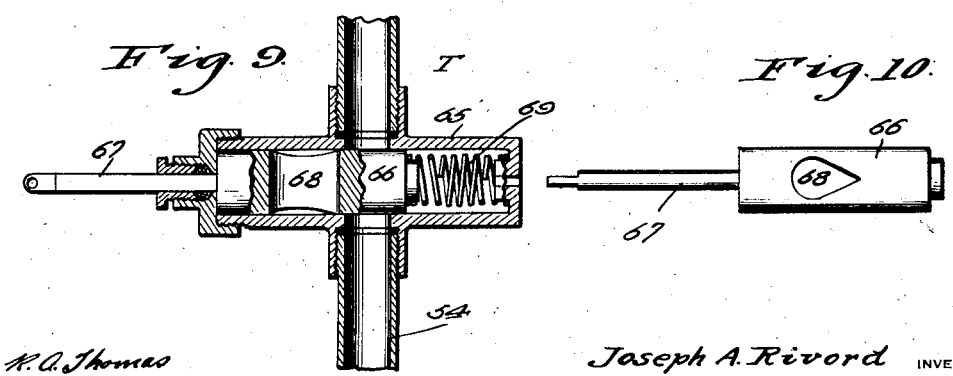
Figure 9 is a sectional view of the throttle valve.
Figure 10 is a detail view of the valve member shown in Figure 9.
Figure 3:
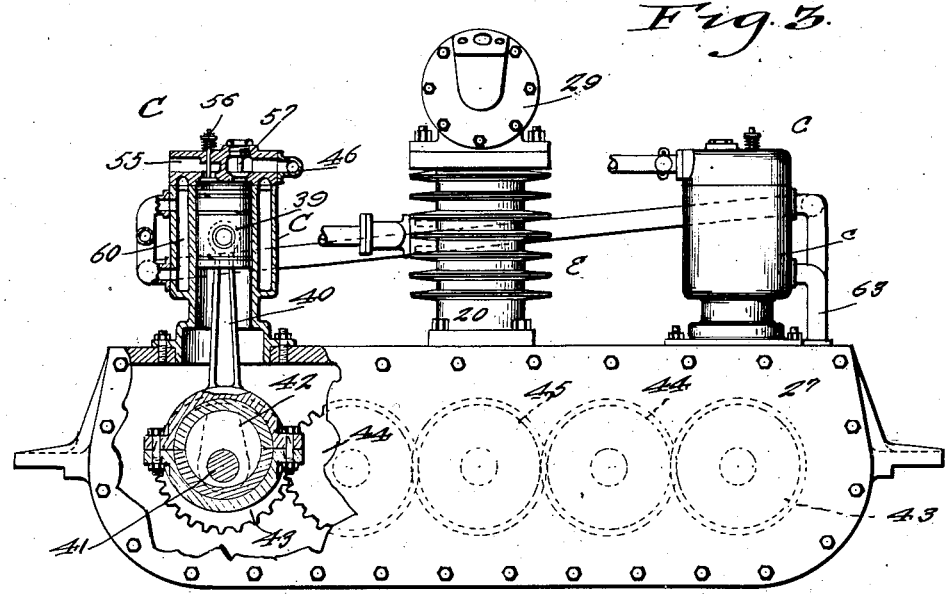
Figure 3 is an end view of the engine, parts being broken away so as to show part of the structure in section.

As previously stated, there is connected in the pipe 54 which supplies air from the tank 51 to the engine, a throttle valve T which is shown in Figures 9 and 10 of the drawings. This valve comprises a casing 65 within which there is slidingly mounted a valve member 66, the latter being provided with a stem 67 which extends through one end of the casing. The valve member 66 is provided with a passage 68 which extends transversely therethrough, the shape of this passage being illustrated in Figure 10 of the drawings. The valve member 66 is normally held in the position shown in Figure 9 of the drawings so as to interrupt the passage of air through the pipe 54, a spring 69 being employed for this purpose. By shaping the passage 68 as shown in the drawings, the quantity of air passing through the pipe 54 may be nicely regulated, initial movement of the valve permitting only a small quantity of air to pass through the restricted end of the passage 68 and this amount gradually increasing as the valve member 66 is moved against the action of the spring 69. Air may thus be supplied to the engine E in accurately regulated quantities. In order to open the valve T, the stem 67 is connected to a foot pedal or other operating member 70 by means of a connecting rod 71, so that the speed of the engine may be regulated after the manner of the throttle of the usual automobile.

Figure 1:
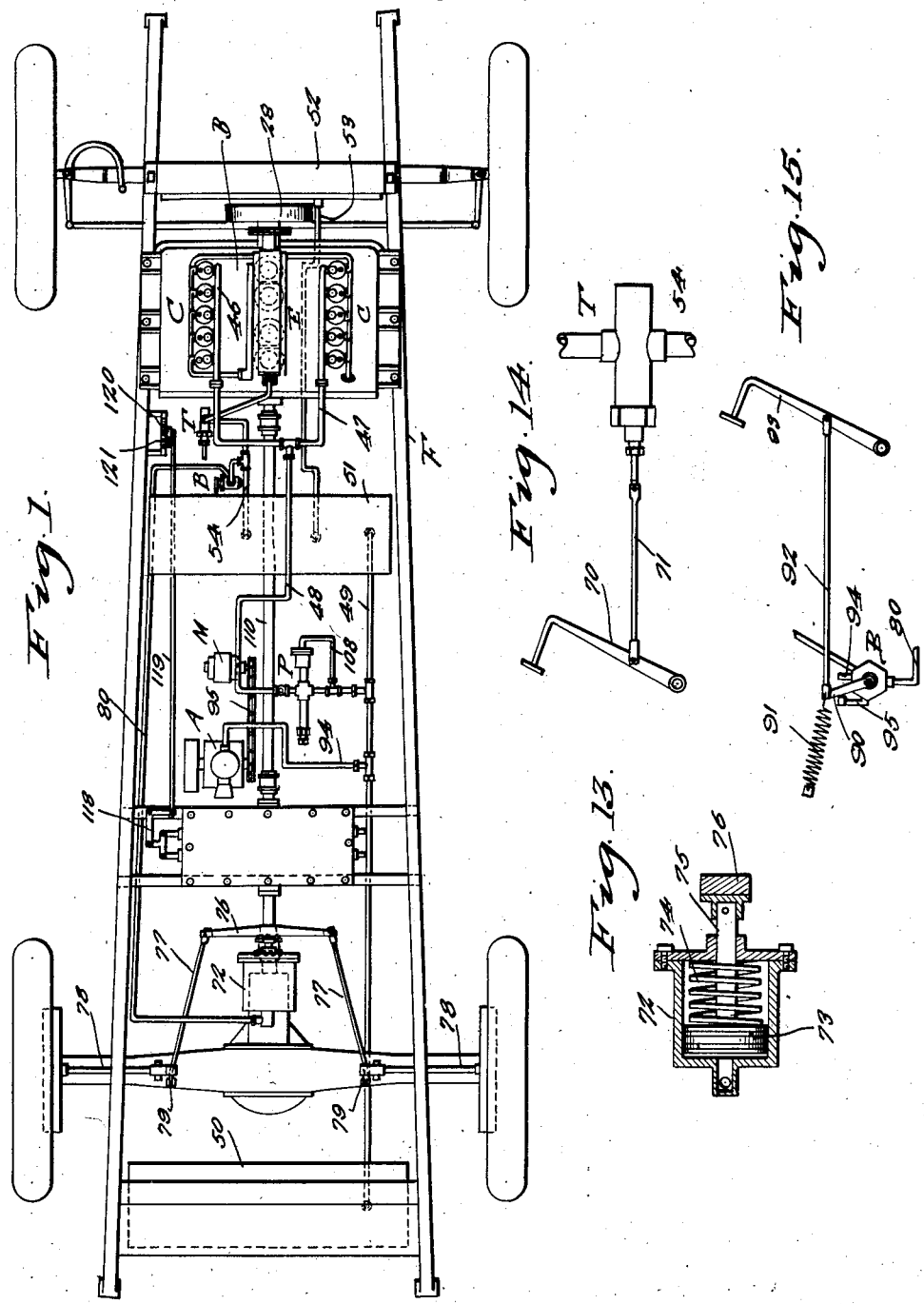
Figure 1 is a plan view of the chassis of an automobile equipped with the invention.

The invention further aims to provide means for operating and controlling the brakes of an automobile and for this purpose there is provided a brake cylinder 72 which is suitably supported upon the frame of the automobile and which has operating therein a piston 73, the latter being normally held in one end of the piston by means of a spring 74. The piston has secured thereto one end of a rod 75 and the outer end of this rod is connected to a bar 76 which extends transversely of the frame of the automobile. Any suitable means may be provided for connecting this bar with the brakes and the latter may be of any shape, such as internal expanding brakes (not shown). The means provided include rods 77 which are connected to the bar 76 and which are operatively connected to rods 78, as shown at 79 in Figure 1 of the drawings. Air under pressure is supplied to the cylinder 72 by means of a pipe 80 which receives air from the cylinder 51, the said pipe being coupled to the pipe 54 as shown in the drawings. Connected in the pipe 80 is a brake valve B which is shown in detail in Figures 11 and 12 of the drawings.

The valve B comprises a casing 81 which is provided with an inlet port 82 to admit air to the said casing and with an outlet port 83, through which air may pass to the brake cylinder 72. Mounted for rotation within the cylinder 81 is a valve member 84 which is provided with a passage 85 extending transversely therethrough, the latter being adapted to establish communication between the ports 82 and 83, so that air may pass from the tank 51 to the cylinder 72 to act upon the piston 73 and apply the brakes. By moving the valve member 84 to the position shown in Figure 12 of the drawings, escape of air from the cylinder 72 may be prevented so that the brakes will remain in applied position and in order to release the brakes without again establishing communication between the ports 82 and 83, the valve member 84 may be slightly rotated toward the right in Figure 12 of the drawings so that the opposite ends of a by-pass or passage 86 may establish communication between the port 83 and an exhaust port 87 provided in the valve casing 81 and leading to the atmosphere through a pipe 88. The valve member 84 has a stem 89 extending therefrom and secured on this stem is an arm 90. This arm is normally held in the position shown in Figure 12 of the drawings by means of a spring 91. An operating rod 92 has one end connected to the arm 90 and its opposite end connected to a foot pedal or other operating member 93, whereby the valve may be operated. Spaced stops 94 and 95 extending from the valve casing 81 serve to limit movement of the arm 90 in either direction.

The tanks 50, 51 and 52 may be initially stored by any suitable means, such as through the medium of the air supply at any service station, but in order to render the mechanism independent of such stations, there is provided an auxiliary compressor A which may be of any suitable type and which is connected by means of a pipe 94 with the pipe 49. This compressor A is operated preferably by means of a motor M and the latter is operated from a suitable motor or generator (not shown) and controlled in the ordinary manner. The motor M is operatively connected to the compressor A through the chain and sprocket connection shown at 95 in Figure 1 of the drawings.

Ordinarily, the compressors C supply compressed air in excess of the amount used by the engine E, but in the event of the supply being at any time inadequate, pressure may be increased by means of the auxiliary compressor A, or at any service station, as previously stated.

The pressure relief valve P which is illustrated in detail in Figures 5 and 6 of the drawings comprises a casing 96 having oppositely disposed inlet and outlet ports 97 and 98 which communicate with the pipe 48 through which air passes from the compressors to the storage tanks. Operating within the casing 96 is a valve member 99 which is provided with a transverse port 100. This port extends through the member 99 and is adapted to open communication between the ports 97 and 98, a spring 101 holding the valve member in this position. The tension of this spring may be accurately regulated by means of an adjusting bolt 102 which is swiveled in one end of the casing 96. The inner end of the bolt 92 has threadedly mounted thereon a nut 103 and the latter is provided with oppositely extending lugs 104 which operate in guide grooves 105 provided in the casing 96. The nut may be thus moved longitudinally of the casing but will be held against rotation. By rotating the bolt 102, adjustment of the nut may be effected and the tension of the spring thus regulated. Extending from the valve member 99 is a stem 106 and secured to this stem is a piston 107. A by-pass pipe 108 has one end in communication with the pipe 48 and the opposite end in communication with the end of the cylinder 96 so that air passing through this pipe may act upon the piston 107 to move the valve member 99 against the spring 101. The valve member 99 is provided with a substantially L-shaped passage 109, one end of which communicates with the passage 100. The opposite end of the passage 109 is adapted to be moved into register with a port 97, so that when pressure in excess of the pressure of the spring 101 passes through the pipe 48, the valve 99 will be moved against the action of the spring so that pressure passing through the pipe 48 will pass through the passage 109, the passage 100 and out through an exhaust port 107 provided in the casing 96.

In addition to the mechanism described, the invention provides a novel and simple form of selective transmission which includes a housing 110 suitably mounted upon the frame of the automobile. In this housing is a bearing for one end short shaft 111 and the latter is connected to the drive shaft of the engine by means of a shaft 110$^a$, while mounted upon the shaft 111 within the housing 110 is a gear 111$^a$. The housing 110 also provides a bearing for a short shaft 112 and the latter is operatively connected to the usual or any preferred differential mechanism. The shaft 112 has secured thereon within the housing 110 a gear 113.

Slidingly mounted within the housing 110 is a pair of spaced parallel bars 114. These bars carry bearings for shafts 115 and the latter have secured upon the opposite ends thereof gears 116 which are adapted to engage the gears 111ª and 113. When moved in one direction, one pair of gears 116 connect the gears 111ª and 113 and the shaft 112 is rotated in one direction so as to drive the automobile in one direction, while by shifting the bars 114 in an opposite direction, the other gears 116 are meshed with the gears 111ª and 113 and the shaft 112 rotated in an opposite direction from its previous direction of rotation.

In order to provide for movement of the bars 114, the latter are connected by means of a connecting member 117 and this member is connected to one arm of a bell crank lever 118 which is mounted for pivotal movement upon the automobile frame. The other arm of the lever 118 is connected to a rod 119 and this rod may be in turn connected to a suitable controlling lever 120. This lever may be held against movement by any suitable means such as its engagement with any one of a number of spaced notches 121 provided in a segment carried by the frame of the automobile. Three notches may be provided, one for holding the transmission mechanism in neutral position, one for holding it in forward position and one for holding it in reverse position.

The invention is susceptible of various changes in its form, proportions and minor details of construction and the right is herein reserved to make such changes as properly fall within the scope of the appended claims.

Having described the invention what is claimed is:

1. In a power mechanism, a storage tank, compressors for supplying air to the tank, an air engine, means for supplying air from the tank to the engine and means for utilizing the exhaust from the engine for cooling the cylinders of the compressors.

2. In a power mechanism, a power unit comprising a base, an air engine mounted thereon, a battery of compressors mounted upon the base upon each side of the engine, a storage tank, means connecting each of the compressors with the storage tank for supplying air to the latter, means connecting the tank and engine and a throttle valve included in the tank and engine connecting means.

3. In a power mechanism, a power unit comprising a base, an air engine mounted thereon, a battery of compressors mounted upon the base upon each side of the engine, a storage tank, means connecting each of the compressors with the storage tank for supplying air to the latter, a pressure relief valve included in the compressor and tank connecting means, means connecting the tank and engine and a throttle valve included in the tank and engine connecting means.

4. In a power mechanism for automobiles, a plurality of main air compressors, a storage tank, means connecting the compressors and storage tank for supplying air to the latter, a pressure regulating valve included in said connecting means, an auxiliary compressor connected in the main compressors and tank connecting means, a motor for operating the auxiliary compressor, an air engine, means connecting the storage tank and engine and means connected in the tank and engine connecting means for controlling the supply of air to the latter.

5. In a power mechanism for automobiles, a plurality of main air compressors, a storage tank, means connecting the compressors and storage tank for supplying air to the latter, a pressure regulating valve included in said connecting means, an auxiliary compressor connected in the main compressors and tank connecting means, a motor for operating the auxiliary compressor, an air engine, means connecting the storage tank and engine, means connected in the tank and engine connecting means for controlling the supply of air to the latter, an air brake including an air operated piston, means for supplying air from the tank for the operation of the piston and means for controlling the supply of air.

6. In a power mechanism for automobiles, a plurality of main air compressors, a storage tank, means connecting the compressors and storage tank for supplying air to the latter, a pressure regulating valve included in said connecting means, an auxiliary compressor connected in the main compressors and tank connecting means, a motor for operating the auxiliary compressor, an air engine, means connecting the storage tank and engine, means connected in the tank and engine connecting means for controlling the supply of air to the latter, an air brake including an air operated piston, means for supplying air from the tank for the operation of the piston and a three-way cock for controlling the supply of air.

7. A three-way valve comprising a casing having an inlet port, an outlet port and an exhaust port, a valve member rotatable therein and having a passage therethrough adapted to open communication between the inlet and outlet ports, and a passage adapted to open communication between the outlet and exhaust ports.

8. An air brake operating mechanism comprising in combination with a supply of air under pressure and a brake cylinder operatively connected to the brakes of a vehicle, of a normally closed valve included in the air supply between the source of said supply and said cylinder, means whereby the valve may be open to supply air to the cylinder for the operation of the brakes, means whereby the valve may be moved to position to cut off said supply and prevent the escape of back pressure from said cylinder and means whereby the valve may be operated to permit of the escape of said pressure without opening communication between said cylinder and the air supply.

9. In a pressure operated power mechanism, a controlling valve having an inlet port and an outlet port and a spring actuated valve member therein for normally closing the port, said valve member being provided with a port having a restricted end.

10. In a pressure system, a relief valve having an inlet port, an outlet port and an exhaust port, a valve member normally establishing communication between the inlet and outlet ports, means for yieldingly holding the valve member in normal position and pressure operated means whereby the valve member may be moved to provide communication between the inlet and exhaust ports.

In testimony whereof I affix my signature.

JOSEPH A. RIVORD.